UNITED STATES PATENT OFFICE.

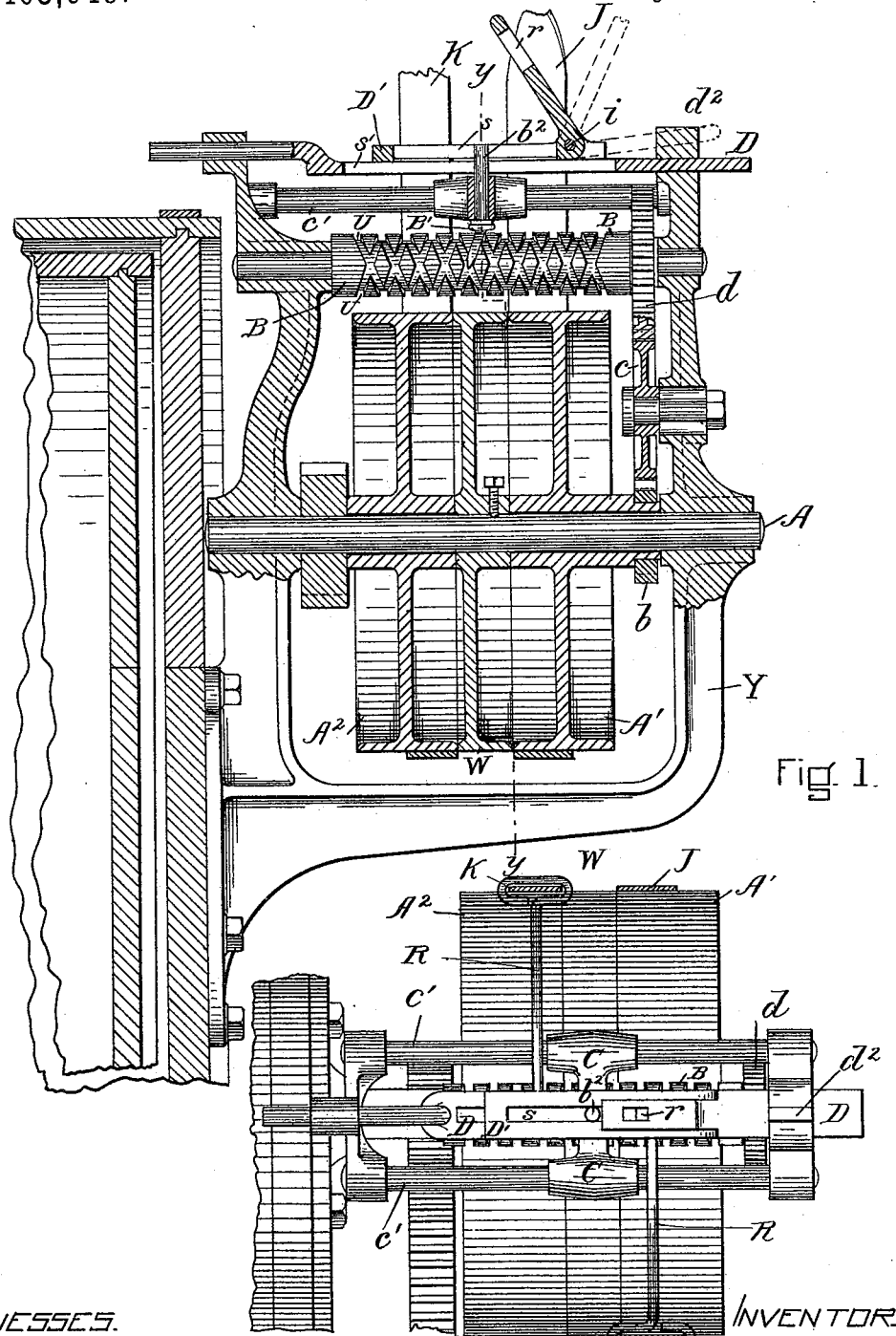

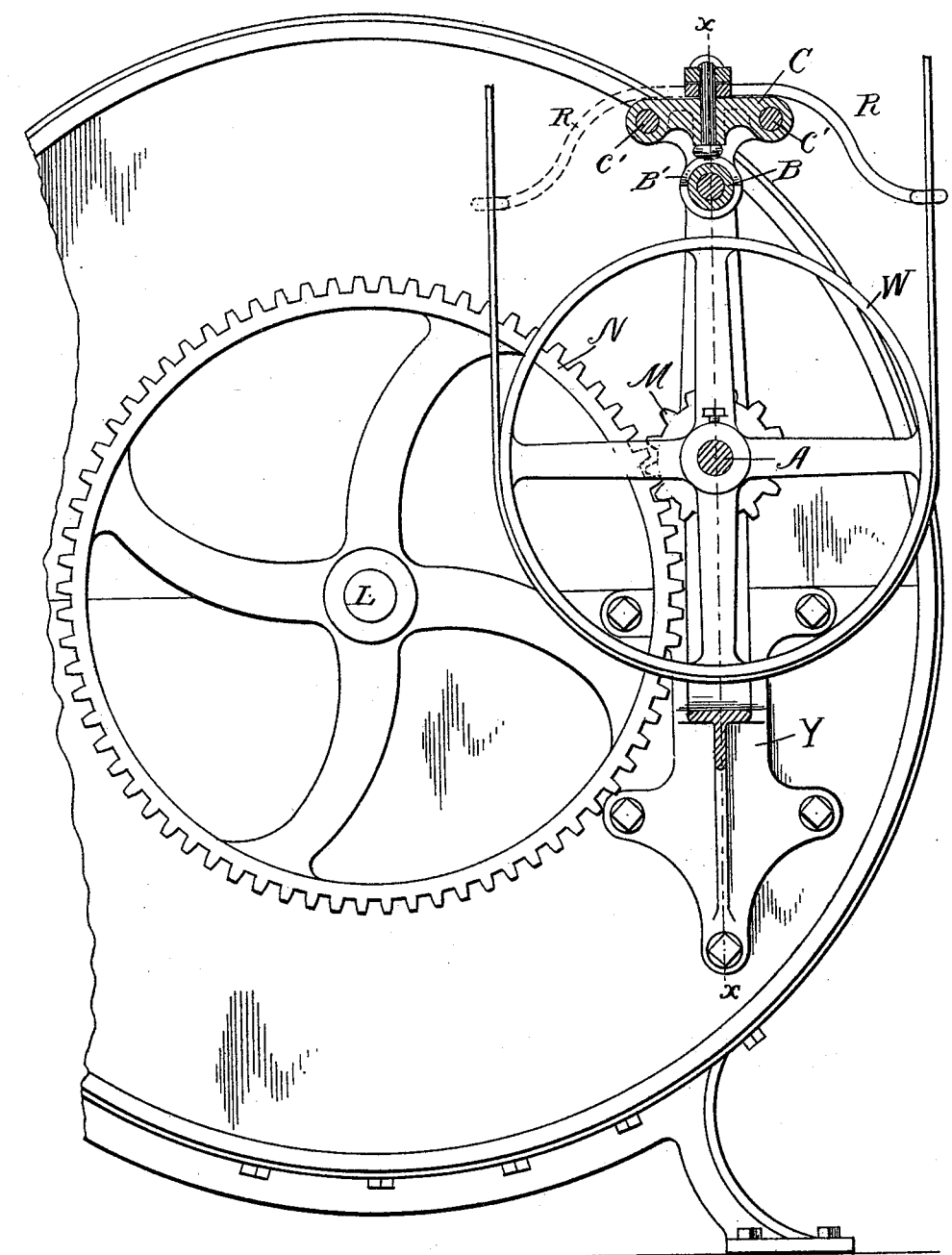

JAMES G. CRAWFORD, OF BOSTON, MASSACHUSETTS.

REVERSING MECHANISM FOR WASHING-MACHINES.

SPECIFICATION forming part of Letters Patent No. 403,649, dated May 21, 1889.

Application filed February 29, 1888. Renewed April 19, 1889. Serial No. 307,872. (No model.)

*To all whom it may concern:*

Be it known that I, JAMES G. CRAWFORD, of Boston, in the county of Suffolk and State of Massachusetts, have invented certain new and useful Improvements in Reversing Mechanism for Washing-Machines, &c., of which the following is a specification.

My invention relates to improvements in belt-shipping devices for washing and other machines, whereby several rotations of the barrel may be made in either direction before reversing; and the objects of my invention are, first, to produce simple, positive and easy movements for sliding the shipper-rod, and, second, to furnish a locking-device for holding said shipper-rod when not in use. I attain these objects by the mechanism illustrated in the accompanying drawings, in which—

Figure 1 is a vertical section on line $x\,x$ of Fig. 3, showing my device attached to the head or end of an ordinary washing-machine. Fig. 2 is a plan view; and Fig. 3, a transverse section on line $y\,y$, Fig. 1.

The shaft A for holding the driving-gear is supported in the usual manner by a suitable frame or bracket, Y, bolted to the machine. To said shaft is affixed the fast pulley W, and on said shaft, at either side of the fast pulley, are the loose pulleys A' A². Upon the hub of the loose pulley A' is formed or fastened a spur-gear, $b$, the purpose of which is to rotate (through the gears $c$ and $d$) the shaft or sleeve B, in the periphery of which are formed intersecting spiral grooves or right and left hand threads U U.

B' represents a curved dog, which is formed to engage either of the grooves U, and is reciprocated lengthwise of the shaft B by its engagement with said grooves when the shaft B is rotated. The dog B' is swiveled on a stud or projection, $b^2$, which is secured to and projects above a yoke, C. Said yoke is adapted to slide on guide-rods $c'\,c'$, attached to the frame Y. By the rotation of shaft B a uniformly-reciprocating movement is imparted to the dog B', the latter being guided in a straight line by means of the rods $c'\,c'$.

The stud $b^2$, on which the dog B' is swiveled, is elongated, so as to project into a slot, $s$, in a bell-crank lever, D', which lever is pivoted at $i$ to the slotted shipper-rod D. When the bell-crank lever D' is thrown over into the position shown by dotted lines, Fig. 1, no movement whatever is imparted to the shipper-rod by the reciprocations of the swiveled dog B'.

One arm of the bell-crank lever is used for a handle, and is provided with an opening, $r$. The length of the slot $s$ in the other arm of said bell-crank is such as to make a part of the motion of the stud $b^2$ in said slot of no effect, the shipper-rod being moved only when the stud $b^2$ comes in contact with the ends of said slot. By using one arm of the bell-crank lever D' for a handle the shipper-rod can be moved backward or forward by hand, thus providing means by which the barrel of the washer may be revolved to the right position for opening. When it is desirable to lock the shipper-rod in a position to prevent the belts from rotating the washer, the opening $r$ in one arm of the lever is allowed to drop down over the projection $d^2$ on the frame or bracket Y, thus securely locking the shipper-rod in its central position and preventing the belts from working over onto the face of the fast pulley.

The belt J, used in driving the loose pulley A', is of sufficient width to revolve said pulley when said belt is shipped over to the fast pulley, so that the reciprocating movement of the dog B' is continuous; but it imparts none of its motion to the shipper-rod unless the bell-crank lever D' is in position over the stud $b^2$.

It is obvious that in place of the spur-gears $b$, $c$, and $d$, used to revolve the right and left hand threaded sleeve B, a belt or chain could be provided.

Of two driving-belts, J K, one is crossed and the other straight or not crossed, as usual, so that one belt will impart rotation to the shaft L of the washing-machine in one direction and the other belt in the opposite direction, said rotation being imparted through a small gear, M, on the shaft A and a larger gear, N, on the shaft L.

I do not limit myself to the employment of the pivoted lever D' in all cases, as the slot $s'$ in the shipper D may be made of such a length that when its end walls are struck by the stud $b^2$ the result will be the same as if the latter were working in the slot $s$ of the lever D'.

The described invention may be used in connection with any other class of machinery in which automatic reversal is necessary.

I claim—

1. The combination, in a reversing mechanism, of the shaft A, the fast pulley W and the loose pulleys A' A² on said shaft, the gear or wheel $b$, affixed to the loose pulley A', the shaft B, having the intersecting spiral grooves or right and left threads, means, substantially as described, for transmitting motion from the gear or wheel $b$ to the shaft B, whereby the latter is rotated with the loose pulley A', a pivoted dog, B', engaged with the spirally-grooved shaft and adapted to be reciprocated thereby, a stud, $b^2$, secured to said dog, and a belt-shipper adapted by means, substantially as described, to be acted on by the dog B' and its stud when the dog is near the ends of its reciprocating movements, as set forth.

2. The combination, in a reversing mechanism, of the shaft A, the fast pulley W and the loose pulleys A' A² on said shaft, the shaft B, having the intersecting spiral grooves or threads, the gear or wheel $b$, affixed to the loose pulley A', means, substantially as described, for transmitting motion from the gear or wheel $b$ to the shaft B, whereby the latter is rotated with the loose pulley A', a pivoted dog, B', engaged with the shaft B and adapted to be reciprocated thereby, a belt-shipper, and an arm or lever, D', pivoted to said shipper and having a slot, $s$, formed to receive a stud or projection which moves with the dog B', said lever being movable, as described, whereby it may be separated from said stud to make the reversing mechanism inoperative, as set forth.

3. The combination, in a reversing mechanism for washing and other machines, of the shaft A, the fast pulley W, the loose pulley A², the loose pulley A', provided with the spur-gear $b$ upon its hub, the spirally-grooved shaft B, having the gear $d$, the gear $c$, connecting the gears $b$ and $d$, the yoke C, the guide-rods $c'$ $c'$, the dog B', engaged with the shaft B and pivoted to the yoke C, the shipper-rod D, provided with the hinged slotted bell-crank lever D', one arm of which is provided with the opening $r$, and the fixed lug $d^2$ on the frame, formed to engage the opening $r$; all arranged and operating substantially as described.

In testimony whereof I have signed my name to this specification, in the presence of two subscribing witnesses, this 25th day of February, 1888.

JAMES G. CRAWFORD.

Witnesses:
C. F. BROWN,
A. D. HARRISON.